(12) United States Patent
Fukatsu et al.

(10) Patent No.: US 7,789,670 B2
(45) Date of Patent: Sep. 7, 2010

(54) PLANAR CONNECTOR

(75) Inventors: Hiroki Fukatsu, Shizuoka (JP);
Kazufumi Watanabe, Shizuoka (JP);
Toshio Shiwaku, Shizuoka (JP);
Hirokazu Ohshiba, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 1031 days.

(21) Appl. No.: 10/592,362

(22) PCT Filed: Mar. 24, 2005

(86) PCT No.: PCT/JP2005/006220

§ 371 (c)(1),
(2), (4) Date: Sep. 11, 2006

(87) PCT Pub. No.: WO2005/093909

PCT Pub. Date: Oct. 6, 2005

(65) Prior Publication Data

US 2007/0197706 A1    Aug. 23, 2007

(30) Foreign Application Priority Data

Mar. 26, 2004    (JP) .............................. 2004-092020

(51) Int. Cl.
*H05K 1/00* (2006.01)
*C09K 19/36* (2006.01)
(52) U.S. Cl. ..................... 439/66; 439/67; 252/299.7
(58) Field of Classification Search ........................ None
See application file for complete search history.

(56) References Cited

U.S. PATENT DOCUMENTS 6,797,198 B1 * 9/2004 Miyashita et al. ...... 252/299.01

FOREIGN PATENT DOCUMENTS

| JP | 07-252406 A2 | 10/1995 |
|----|--------------|---------|
| JP | 09-204951 A  | 8/1997  |
| JP | 11-092672 A2 | 4/1999  |
| JP | 2000-026743 A2 | 1/2000 |
| JP | 2000-178443 A2 | 6/2000 |
| JP | 2002-194188 A2 | 7/2002 |

OTHER PUBLICATIONS

English Translation of relevant parts of "Total Survey of Engineering Plastics", '92-'93, pp. 182-194, (1992).

* cited by examiner

*Primary Examiner*—D. L Tarazano
*Assistant Examiner*—Camie S Thompson
(74) *Attorney, Agent, or Firm*—Buchanan Ingersoll & Rooney PC

(57) ABSTRACT

The present invention provides a very thin planar connector having 2 mm or smaller pitch interval at the lattice area and 0.5 mm or smaller thickness of the lattice area, giving excellent performance in the whole performances such as moldability, flatness, warp-deformation, and heat resistance. A planar connector having a lattice structure within an outer frame is molded by using (C) a resin composition prepared by compounding (A) a liquid-crystalline polymer with (B) a fibrous filler, while the relation between the compounding quantity and the weight-average length of (B) the fibrous filler is controlled to a specified range.

10 Claims, 3 Drawing Sheets

Detail of A section

Detail of B section

PLANAR CONNECTOR

TECHNICAL FIELD

The present invention relates to a planar connector such as a CPU socket, having a lattice structure within outer frame thereof.

BACKGROUND ART

Among thermoplastic resins, liquid-crystalline polymers are known as the materials having excellent dimensional accuracy, damping performance and flowability, and giving very few flash during molding thereof. Owing to these advantageous characteristics, liquid-crystalline polymers have been applied as the materials for various electronics parts in a large quantity.

In particular, with the current requirements for the connectors to have increased heat-resistance (increased productivity by improving the mounting technology), densification (adoption of multi-core structure), and miniaturization, accompanied with ever-increasing performance of electronics devices in recent years, liquid-crystalline polymer compositions which have the above-described characteristics of liquid-crystalline polymers and which are reinforced by glass fibers are adopted as the materials for connectors, ("Total Survey of Engineering Plastics, '92-'93", pp. 182-194, (1992); and JP-A 9-204951). The design of planar connectors having a grid structure within the outer frame thereof, represented by CPU sockets, shows significant movement of above-described increased heat resistance, densification and miniaturization, and many of the planar connectors adopt glass-fiber reinforced liquid-crystalline polymer compositions.

Even the glass-fiber reinforced liquid-crystalline polymer compositions having good flowability to some degree, however, cannot acquire the performance to satisfy the specification of very thin planar connectors desired in recent years, having 2 mm or smaller contact pitch at the lattice area and having 0.5 mm or smaller thickness of resin portion in the lattice area for holding terminals. For those kinds of planar connector having very thin thickness at the lattice area, filling a resin in the grid section increases the required filling pressure because of insufficient flowability of the resin at the section, thereby raising a problem of increased warp-deformation of the obtained planar connector.

A means to solve the problem is to adopt a liquid-crystalline polymer composition which has good flowability by decreasing the adding amount of glass fibers. That type of composition, however, has insufficient strength, thus raising a problem of deformation generated during reflow in mounting step.

Consequently, there is no planar connector made of liquid-crystalline polymer, having excellent balance of performance characteristics.

DISCLOSURE OF THE INVENTION

As described above, there are many studies of liquid-crystalline polymer compositions for planar connectors having a grid structure. Specifically for the very thin planar connectors having 2 mm or smaller pitch interval at the lattice area and having 0.5 mm or smaller thickness of the lattice area, however, there was found no material having excellent performance including all of moldability, flatness, warp-deformation resistance, heat resistance, and the like.

In view of the above-problems, the inventors of the present invention conducted detail searches and investigations for providing a planar connector made of liquid-crystalline polymer, giving excellent balance of performance characteristics, and found that a fiber-reinforced liquid-crystalline polymer composition which satisfies a certain relation between the weight-average length of blending fibrous filler and the blending quantity thereof provides a planar connector having excellent performance including all of moldability, flatness, warp-deformation resistance, heat resistance, and the like, thereby completed the present invention.

The present invention provides a planar connector having a grid structure within the outer frame thereof, being constituted by a resin composition (C) prepared by compounding a liquid-crystalline polymer (A) with a fibrous filler (B), while the relation between compounding quantity and weight-average length of the fibrous filler (B) satisfying the interior portion of the area (D) defined as follows:

(Area (D))

$$X=40 \tag{1}$$

$$X=53 \tag{2}$$

$$Y=160 \tag{3}$$

$$Y=360 \tag{4}$$

$$Y=(18222/X)-84.44 \tag{5}$$

where, the X axis signifies the compounding quantity of the fibrous filler (B), (weight percentage of (B) in the resin composition (C)), and the Y axis signifies the weight-average length (μm) of the fibrous filler (B).

Furthermore, the present invention provides the use of the above-mentioned resin composition (C) for a planar connector having a lattice structure within the outer frame thereof.

Figure 1:
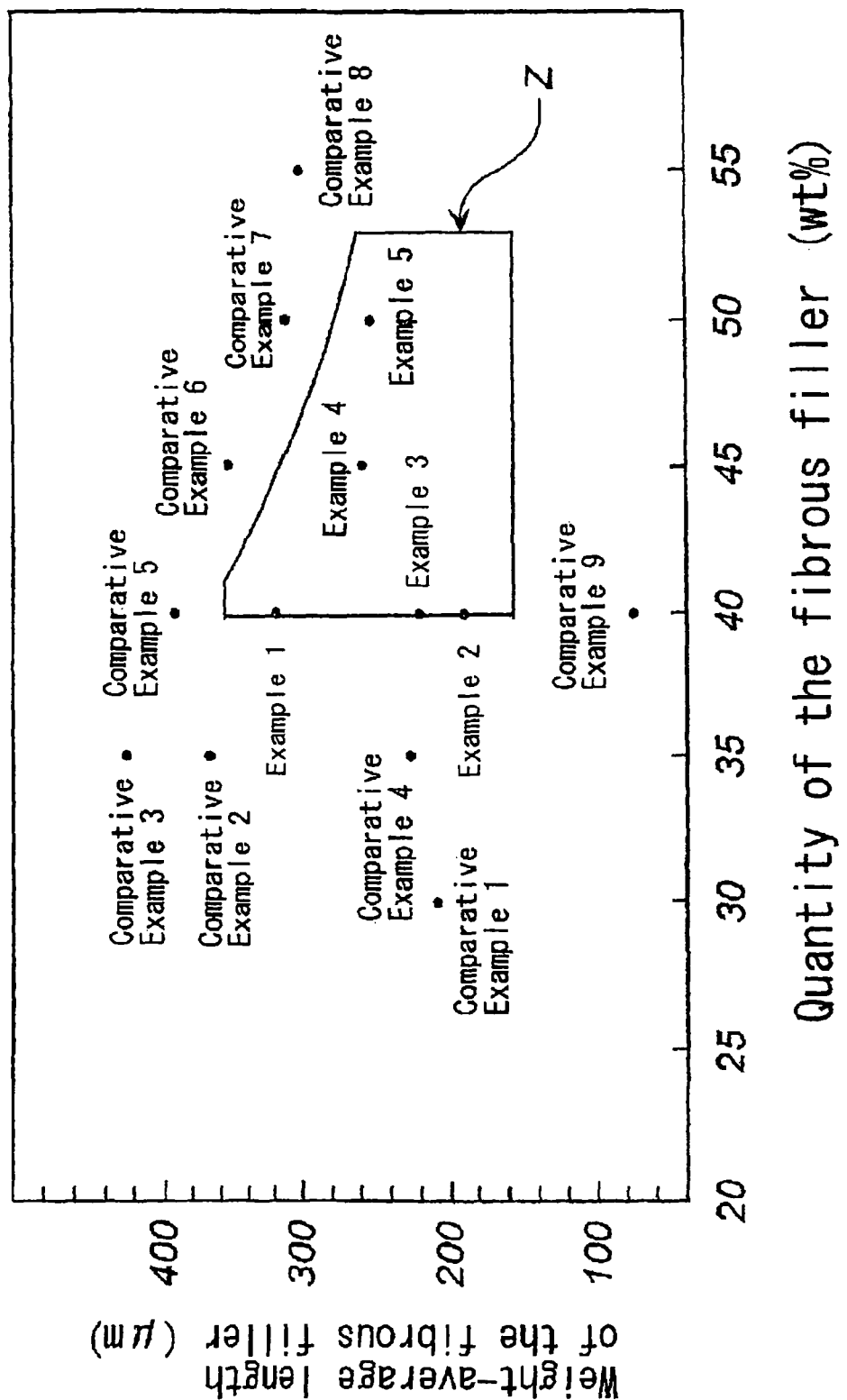
FIG. 1 is a graph showing the area of relation between the compounding quantity and the weight-average length of the fibrous filler in the resin compositions specified by the present invention.

The reference symbols given in the figures are the following.
1 Resin overflow well
2 Pitch interval at the lattice area
3 Thickness of the grid section
11 Main feed port
12 Plasticizing zone
13 Side feed port
14 Kneading zone
15 Vent port
16 Die
17 Decompression apparatus

DETAIL DESCRIPTION OF THE INVENTION

The present invention is described below in detail. The liquid-crystalline polymer (A) used in the present invention is a melt-processable polymer having properties capable of forming an optically anisotropic molten phase. The properties of anisotropic molten phase can be identified by an ordinary polarization inspection method utilizing crossed polarizers. More specifically, the identification of anisotropic molten phase can be done by observing a molten specimen placed on a Leitz hot stage in a Leitz polarization microscope (at ×40 magnification) under a nitrogen atmosphere. Inspection of the liquid-crystalline polymer applicable to the present invention between crossed polarizers generally allows a polarized light to normally pass through even in a molten and stationary state, and observes optical anisotropy.

Although there is no specific limitation on the above liquid-crystalline polymer (A), an aromatic polyester or an aromatic polyester amide is preferred. A polyester which contains an aromatic polyester or an aromatic polyester amide partially within the same molecular chain is also applicable. Those applicable liquid-crystalline polymers are the ones which, when they are dissolved in pentafluorophenol at 60° C. by an amount of 0.1% by weight, preferably give inherent viscosity (I.V.) of at least about 2.0 dl/g, and more preferably in a range from 2.0 to 10.0 dl/g.

Specifically preferred aromatic polyester or aromatic polyester amide as the liquid-crystalline polymer (A) applicable to the present invention includes an aromatic polyester and an aromatic polyester amide, containing at least one compound selected from the group consisting of aromatic hydroxycarboxylic acid, aromatic hydroxyamine and aromatic diamine as a structural component.

More specific examples are: (1) a polyester composed mainly of one or more of aromatic hydroxycarboxylic acid and a derivative thereof; (2) a polyester composed mainly of (a) one or more of aromatic hydroxycarboxylic acid and a derivative thereof, (b) one or more of aromatic dicarboxylic acid, alicyclic dicarboxylic acid, and a derivative thereof, and (c) one or more of aromatic diol, alicyclic diol, aliphatic diol, and a derivative thereof; (3) a polyester amide composed mainly of (a) one or more of aromatic hydroxycarboxylic acid and a derivative thereof, (b) one or more of aromatic hydroxyamine, aromatic diamine, and a derivative thereof, and (c) one or more of aromatic dicarboxylic acid, alicyclic dicarboxylic acid, and a derivative thereof; and (4) a polyester amide composed mainly of (a) one or more of aromatic hydroxycarboxylic acid and a derivative thereof, (b) one or more of aromatic hydroxyamine, aromatic diamine, and a derivative thereof, (c) one or more of aromatic dicarboxylic acid, alicyclic dicarboxylic acid, and a derivative thereof, and (d) one or more of aromatic diol, alicyclic diol, aliphatic diol, and a derivative thereof. Furthermore, a molecular weight adjuster may be added to the above structural components, as needed.

Preferred examples of the specific compound structuring the above liquid-crystalline polymer (A) applicable to the present invention are: an aromatic hydroxycarboxylic acid such as p-hydroxy benzoic acid or 6-hydroxy-2-naphthoic acid; an aromatic diol such as 2,6-dihydroxynaphthalene, 1,4-dihydroxynaphthalene, 4,4'-dihydroxybiphenyl, hydroquinone, resorcin, or a compound represented by the following formula (I) or the following formula (II); an aromatic dicarboxylic acid such as terephthalic acid, isophthalic acid, 4,4'-diphenyl dicarboxylic acid, 2,6-naphthalene dicarboxylic acid, or a compound represented by the following formula (III); and an aromatic amine such as p-aminophenol or p-phenylene diamine.

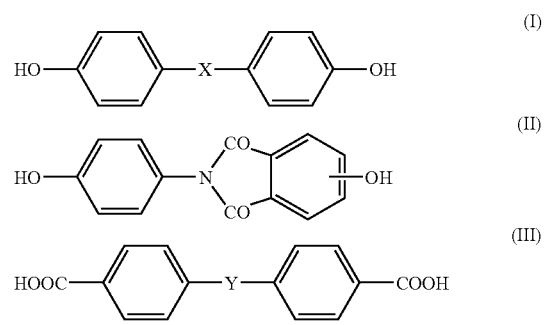

where, X signifies alkylene (C1 to C4), alkylidene, or a group selected from —O—, —SO—, —SO$_2$—, —S— and —CO—; and Y signifies a group selected from —(CH$_2$)$_n$— (n=1 to 4) and —O(CH$_2$)$_n$O— (n=1 to 4).

Specifically preferred liquid-crystalline polymer (A) applicable to the present invention is an aromatic polyester containing p-hydroxy benzoic acid or 6-hydroxy-2-naphthoic acid as the main structural unit component.

The resin composition (C) used in the present invention is prepared by compounding the above-mentioned liquid-crystalline polymer (A) with the fibrous filler (B). It is, however, essential that the relation between the compounding quantity and the weight-average length of the fibrous filler (B) being compounded falls in the specified area (D) defined below.

(Area (D))

The area enclosed by following functions (1) through (5):

$$X=40 \quad (1)$$

$$X=53 \quad (2)$$

$$Y=160 \quad (3)$$

$$Y=360 \quad (4)$$

$$Y=(18222/X)-84.44 \quad (5)$$

where, the X axis signifies the compounding quantity of the fibrous filler (B) (weight percentage of (B) in the resin composition (C)), and the Y axis signifies the weight-average length (μm) of the fibrous filler (B).

The above area (D) is the area of Z in FIG. 1, where the weight-average length of the fibrous filler (B) is basically required to be (3) Y=160 μm or larger and (4) Y=360 μm or smaller.

If the weight-average length of the fibrous filler (B) is smaller than 160 μm, the effect of reinforcement becomes small, and even increased quantity of compounding thereof cannot acquire the desired effect. In addition, if the weight-average length of the fibrous filler (B) exceeds 360 μm, even decreased quantity of compounding thereof worsens the flowability, and fails to obtain a connector with excellent flatness. Here, the term "weight-average length of the fibrous filler (B)" referred to herein signifies the value in the molded article, and is able to be determined by a method described later. Although the fiber diameter of the fibrous filler (B) is not specifically limited, generally fiber diameters of the order of 5 to 15 μm are adopted.

Further, regarding the compounding quantity of the fibrous filler (B), (compounding percentage in the complex resin composition (C)), it is necessary to satisfy (1) X=40% by weight or larger and (2) X=53% by weight or smaller.

If the compounding quantity of the fibrous filler (B) is smaller than 40% by weight, even a fibrous filler having relatively large weight-average length gives only a small effect of reinforcement, thus failing to attain the desired effect. Further, if the compounding quantity of the fibrous filler (B) exceeds 53% by weight, even a fibrous filler having relatively small weight-average length worsens the flowability, thus failing to attain a connector with excellent flatness.

Furthermore, the above area (D) is required to satisfy the condition of (5) Y=(18222/X)−84.44. That is, even in the area enclosed by the above functions of (1) to (4), increase in the compounding quantity of the fibrous filler (B), (to 41% by weight or larger), worsens the balance of flowability and strength/flatness, thus failing to attain the desired effect of the present invention unless the fibrous filler (B) is the one having small weight-average length.

Examples of the fibrous filler (B) used in the present invention are glass fiber, carbon fiber, whisker, inorganic fiber and mineral fiber. Among them, glass fiber is preferred.

The resin composition (C) used in the present invention is required to have excellent flowability. If the required characteristic of flowability is defined in terms of viscosity, it is preferred to give 55 Pa·s or smaller apparent melt viscosity, determined using a capillary rheometer (L=20 mm and d=1 mm), at 360° C. and 1000/s of shear rate conforming to ISO 11443.

The composition which has that apparent melt viscosity is prepared using a liquid-crystalline polymer having ordinary melt viscosities (10 to 100 Pa·s, preferably 10 to 40 Pa·s), while compounding the fibrous filler (B) within a range to satisfy the above condition.

A common method to obtain that type of composition is melt-kneading in an extruder, though there is no specific limitation on the method. In many cases, however, these compositions cannot be prepared by ordinary extrusion method in which the fibrous filler is charged to the molten liquid-crystalline polymer from a side feed port. Therefore, it is necessary to adopt a method of melting to knead again once-melted and kneaded liquid-crystalline polymer composition compounded with the fibrous filler, or a method of charging the liquid-crystalline polymer in pellet shape (1 mm or larger particle size) from a side feed port together with the fibrous filler. A preferable method therefor is the one to charge the liquid-crystalline polymer in pellet shape from a side of small heat-history. In addition, as for the extruder, a twin-screw extruder which is easy for side-feeding is preferred.

By molding the resin composition (C) of the present invention, various kinds of planar connecters can be obtained. In particular, the method of the present invention is specifically effective to obtain a very thin planar connector having 2 mm or smaller pitch interval at the lattice area, 0.5 mm or smaller thickness of resin portion in the lattice area for holding the terminals, and 5.0 mm or smaller total product thickness. However, that kind of industrially applicable planar connector was not available in related art.

Figure 2:
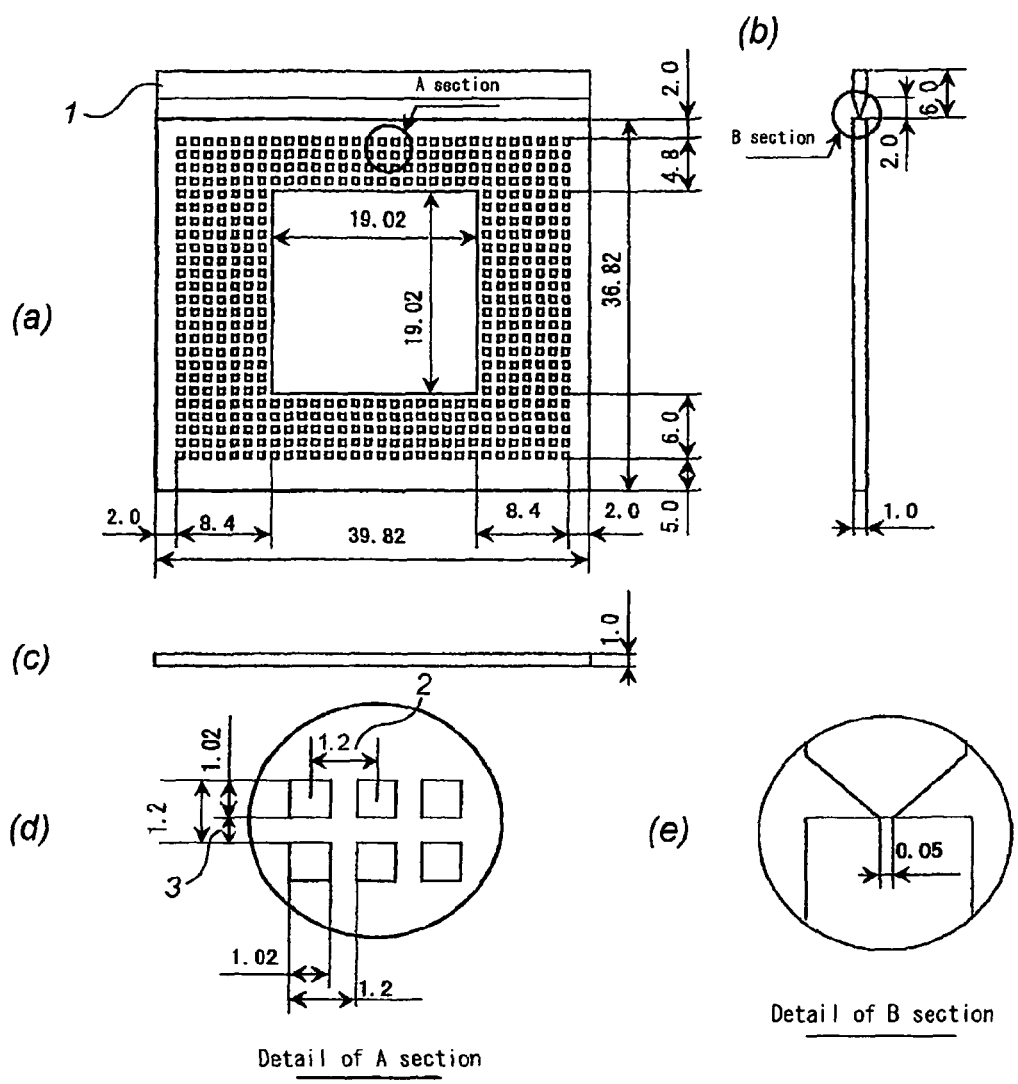
FIG. 2 shows a planar connector being molded in Example, FIG. 2(a) showing the plan view, FIG. 2(b) showing the right side view, FIG. 2(c) showing the front view, FIG. 2(d) showing the detail of "A" section and FIG. 2(e) showing the detail of "B" section. Here, the unit of values in the figure is millimeter.

A further detailed description of that type of planar connector is a connector shown in FIG. 2, molded in an example, having several hundreds of pin-holes within a product area of the order of 40 mm×40 mm×1 mm. It is a matter of course that as shown in FIG. 2, the planar connector according to the present invention is able to have an opening of adequate area in the lattice area.

As shown in FIG. 2, by applying the resin composition (C) of the present invention, it is possible to mold a very thin planar connector, with good moldability, having 2 mm or smaller (1.2 mm) pitch interval at the lattice area, and having 0.5 mm or smaller (0.18 mm) thickness of resin portion in the lattice area for holding the terminals, while assuring excellent flatness.

When the flatness is defined by numeral expression, a planar connector which has 0.09 mm or smaller flatness before subjected to IR reflow for surface mounting at peak temperatures ranging from 230° C. to 280° C., and has 0.02 mm or smaller difference in flatness before and after the reflow, gives a practically excellent flatness.

Although there is no specific limitation of the method for molding that type of connector having excellent flatness, the injection molding method is preferably adopted from the economic point of view. To attain the connector having that excellent flatness using the injection molding method, it is preferred to select a molding condition free from residual internal stress, adding to the importance of using the above liquid-crystalline polymer composition. To decrease the filling pressure, and thus to decrease the residual internal stress of the obtained connector, the cylinder temperature of the molding machine is preferably at or above the melting point T° C. of the liquid-crystalline polymer. Further, since excessively high cylinder temperature raises problems such as drooling from the cylinder nozzle, caused by decomposition of resin, the cylinder temperature is between T° C. and (T+30)° C., preferably between T° C. and (T+15)° C. In addition, the mold temperature is preferably between 70° C. and 100° C. Low mold temperature is not preferable because the filled resin composition becomes poor in flowability. Excessively high mold temperature is not preferable because of raising problems of flash-generation and the like. The molding is preferably conducted at injection speeds of 150 mm/sec or more. Low injection speed sometimes provides only non-filling molded articles. Even if a fully-filled molded article is obtained at low injection speed, the filling pressure is high, and the article has large residual internal stress, which provides only connectors with poor flatness, in some cases.

Incidentally, to the resin composition (C), the composition acquiring desired characteristics by adding additives such as nucleation agent, carbon black, pigment such as inorganic calcined pigment, antioxidant, stabilizer, plasticizer, lubricant, releasing agent and flame-retardant agent is also included in the resin composition (C) according to the present invention.

EXAMPLES

The present invention is described in more detail in the following referring to Examples. The present invention is, however, not limited to these Examples. Here, the methods for determination of physical properties and the test methods in these Examples are as follows.

(1) Determination of Weight-Average Length of Glass Fibers

Five grams of resin composition pellets were heated to 600° C. for 2 hours to be incinerated. The ash residue was fully dispersed in an aqueous solution of 5% polyethylene glycol. The dispersed mixture was transferred to a petri dish using a dropping pipette. The glass fibers in the mixture were observed using a microscope. At the same time, with an image-analyzer (LUZEX FS, manufactured by NIRECO Corporation), the weight-average length of the glass fibers was determined. Note that, the image analysis was conducted using a subroutine to separate the overlaid fibers into individual fibers to determine the length thereof. Here, the determination was done by excluding the glass fibers having 50 μm or smaller length.

(2) Apparent Melt Viscosity

By applying a capillary rheometer having L=20 mm and d=1 mm, (CAPILOGRAPH 1B, manufactured by Toyo Seiki Seisaku-sho, Ltd.), the apparent melt viscosity was determined at 360° C. and 1000/s of shear rate conforming to ISO 11443.

(3) Determination of Flatness of Connector

Using the resin composition pellets, a planar connector (494 pin holes) was molded by injection-molding under the condition given below. The planar connector had a total size of 39.82 mm×36.82 mm×1 mm t, a hole-opening of 19.02 mm×19.02 mm at the center thereof, and a 1.2 mm of pitch interval at the lattice area, as shown in FIG. 2.

Here, the applied gate was a film gate on the opposite side to the resin overflow well, having a gate thickness of 3 mm.

The prepared connector was placed on a horizontal table, and the connector height was determined using a vision measuring machine (Quick Vision 404 PROCNC, manufactured by Mitsutoyo Corporation). The determination was given by measuring the positions at 10 mm of intervals along the line of 0.5 mm from an edge of the connector, then by determining the difference between the maximum height and the minimum height as the flatness.

Furthermore, with a large desk-top reflow soldering apparatus (RF-300, manufactured by Japan Pulse Laboratories, Inc.), the connector was heated for 5 minutes to a peak temperature of 250° C., and then the flatness was determined by the above procedure to derive the difference of flatness between before and after the reflow.

(Molding Condition)

Molding machine: FANUC α-50C (using a long nozzle with medium diameter)

Cylinder temperature: (Nozzle) 350° C.-350° C.-340° C.-330° C.

Mold temperature: 80° C.

Injection speed: 200 mm/sec

Holding pressure: 29 MPa

Filling time: 0.08 sec

Pressure holding time: 1 sec

Cooling time: 5 sec

Screw rotational speed: 120 rpm

Screw backpressure: 0.5 MPa (4) Flexural Modulus

Using injection-molded pieces (125 mm×12.7 mm×0.8 mm), the flexural modulus was determined in accordance with ASTM D790.

Examples 1 to 5 and Comparative Examples 1 to 9

The above test pieces of the liquid-crystalline polymer composition containing glass fibers were prepared under the following conditions and were evaluated. The results are shown in Table 2.

[Manufacturing Conditions]

(Applied Components)

Polymer: Liquid-crystalline polymer pellets (VECTRA E950i, manufactured by Polyplastics Co., Ltd.); Base polymer giving 335° C. of melting point and 30 Pa·s of viscosity (determined at 350° C. and 1000/s of shear rate); Pellet size of about 5 to 3 mm×about 3 to 2 mm×about 3 to 1 mm.

Glass fiber (1) Examples 1 to 5, Comparative Examples 1 to 8

CS03JA419, manufactured by Asahi Fiber-Glass Co., Ltd., (chopped strand fiber having 10 μm of fiber diameter)

(2) Comparative Example 9

PF70, manufactured by Nitto Boseki Co., Ltd., (Milled fiber having 10 μm of fiber diameter and 80 μm of fiber length)

Lubricant: UNISTAR H-476, manufactured by NOF CORPORATION (Compound Apparatus)

Extruder: Twin screw extruder TEX-30α, manufactured by Japan Steel Works, Ltd. (screw diameter 32 mm, L/D 38.5)

Figure 3:
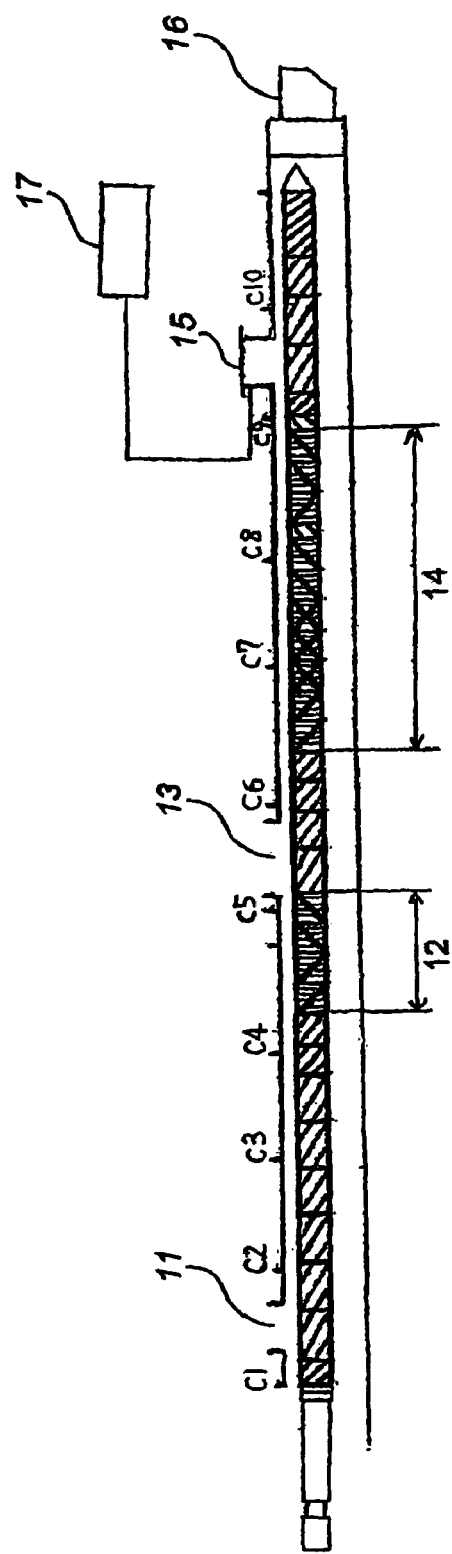
FIG. 3 is a schematic drawing of a screw of extruder applied in Example.

The schematic drawing of screw of the extruder is shown in FIG. 3.

Main feed port 11: C1

Plasticizing section 12: C4-C5 (Configuration (from upstream side): forward kneading, reverse kneading; length 128 mm)

Side feed port 13: C5

Kneading section 14: C6 to C8 (Configuration (from upstream side): forward kneading, orthogonal kneading, reverse kneading, reverse flight, forward kneading, reverse kneading, reverse flight; length 352 mm)

Feeder to main feed port: Screw type loss-in-weight feeder, manufactured by Japan Steel Works, Ltd.

Feeder to side feed port:

Pellet resin: Screw type loss-in-weight feeder, manufactured by K-TRON Co., Ltd.

Glass fiber: Screw type loss-in-weight feeder, manufactured by Japan Steel Works, Ltd.

(Extrusion Condition)

Cylinder temperature: 200° C. only for the cylinder C1 at the main feed port 11, and 350° C. for other cylinders.

Die temperature: 350° C.

(Method of Kneading and Extruding the Composition)

To the above twin screw extruder, the pellets of liquid-crystalline polymer were charged from the main feed port 11 and the side feed port 13, while the lubricant was charged from the main feed port 11, and the glass fibers were charged from the side feed port 13. The charge of materials to the side feed port was done by a twin screw side feeder while controlling the ratios of the liquid-crystalline polymer pellets, the lubricant, and the glass fibers to the respective values given in Table 1 using the respective weighing feeders. The screw rotational speed and the extrusion rate were selected to the respective values given in Table 1. The molten resin composition extruded in strand shape from the die 16 was cooled by water spray during the passage of transfer on a mesh conveyer belt manufactured by Tanaka Seisakusho Co., Ltd. The cooled strand was then cut to pellets. The pellets were molded by an injection molding machine to form the above test pieces. Thus prepared test pieces were evaluated. The results are shown in Table 2.

Here, the relation between the compounding quantity and the weight-average length of the glass fibers in each of the resin compositions of Examples and Comparative Examples is plotted in FIG. 1.

TABLE 1

|  | Adding amount from main feed port 11 (wt %) | | Adding amount from side feed port 13 (wt %) | | Rotational speed (rpm) | Throughput rate (kg/hr) |
| --- | --- | --- | --- | --- | --- | --- |
|  | Liquid-crystalline polymer | Lubricant | Liquid-crystalline polymer | Glass fiber | | |
| Example 1 | 29.7 | 0.3 | 30 | 40 | 300 | 35 |
| Example 2 | 9.7 | 0.3 | 50 | 40 | 300 | 35 |
| Example 3 | 14.7 | 0.3 | 45 | 40 | 300 | 35 |
| Example 4 | 14.7 | 0.3 | 40 | 45 | 300 | 25 |
| Example 5 | 14.7 | 0.3 | 35 | 50 | 300 | 25 |
| Comparative Example 1 | 9.7 | 0.3 | 60 | 30 | 300 | 35 |
| Comparative Example 2 | 64.7 | 0.3 | — | 35 | 300 | 25 |
| Comparative Example 3 | 64.7 | 0.3 | — | 35 | 300 | 25 |
| Comparative Example 4 | 9.7 | 0.3 | 55 | 35 | 300 | 35 |
| Comparative Example 5 | 59.7 | 0.3 | — | 40 | 300 | 25 |
| Comparative Example 6 | 54.7 | 0.3 | — | 45 | 300 | 25 |
| Comparative Example 7 | 44.7 | 0.3 | 5 | 50 | 300 | 25 |
| Comparative Example 8 | 39.7 | 0.3 | 5 | 55 | 300 | 25 |
| Comparative Example 9 | 59.7 | 0.3 | — | 40 | 300 | 25 |

TABLE 2

|  | Quantity of the glass fiber (wt %) | Weight-average length of the glass fiber (μm) | Melt viscosity (Pa · s) | Flatness before the reflow (mm) | Difference in fitness before and after the reflow (mm) | Flexural modulus (GPa) |
| --- | --- | --- | --- | --- | --- | --- |
| Example 1 | 40 | 320 | 40 | 0.073 | 0.009 | 16.2 |
| Example 2 | 40 | 190 | 36 | 0.059 | 0.003 | 15.6 |
| Example 3 | 40 | 226 | 31 | 0.048 | 0.002 | 15.6 |
| Example 4 | 45 | 264 | 37 | 0.083 | 0.009 | 18.5 |
| Example 5 | 50 | 255 | 39 | 0.083 | 0.007 | 20.0 |
| Comparative Example 1 | 30 | 214 | 32 | 0.061 | 0.045 | 14.0 |
| Comparative Example 2 | 35 | 370 | 57 | 0.073 | 0.021 | 17.8 |
| Comparative Example 3 | 35 | 430 | 59 | 0.069 | 0.027 | 17.9 |
| Comparative Example 4 | 35 | 229 | 32 | 0.067 | 0.102 | 15.8 |
| Comparative Example 5 | 40 | 397 | 56 | 0.092 | 0.010 | 19.4 |
| Comparative Example 6 | 45 | 359 | 60 | * | * | 20.5 |
| Comparative Example 7 | 50 | 315 | 67 | * | * | 20.9 |
| Comparative Example 8 | 55 | 305 | 80 | * | * | 22.0 |
| Comparative Example 9 | 40 | 80 | 57 | 0.072 | 0.088 | 15.5 |

* The obtained molded articles were only non-filling ones because of poor flowability.

The invention claimed is:

1. A planar connector including an outer frame and a lattice structure within the outer frame wherein the planar connector has a 2 mm or smaller pitch interval at the lattice area, a 0.5 mm or smaller thickness of the lattice area, and a 5.0 mm or smaller total height, the connector being constituted by (C) a resin composition prepared by compounding (A) a liquid-crystalline polymer with (B) a fibrous filler, while the relation between compounding quantity and weight-average length of the compounded (B) fibrous filler satisfying the interior portion of the area (D) defined as follows:

The area enclosed by following functions (1) through (5):

$$X = 40 \quad (1)$$

$$X = 53 \quad (2)$$

$$Y = 160 \quad (3)$$

$$Y = 360 \quad (4)$$

$$Y = (18222/X) - 84.44 \quad (5)$$

where, the X axis signifies the compounding quantity of (B) the fibrous filler (weight percentage of (B) in (C) the resin composition), and the Y axis signifies the weight-average length (μm) of (B) the fibrous filler.

2. The planar connector according to claim 1, wherein (C) the resin composition has 55 Pa·s or smaller apparent melt viscosity determined by using a capillary rheometer having L=20 mm and d=1 mm, at 360° C. and 1000/s of shear rate, conforming to ISO11443.

3. The planar connector according to claim 1, having 0.09 mm or smaller flatness before IR-reflow step for surface mounting at a peak temperature of 230° C. to 280° C., and having 0.02 mm or smaller difference in flatness before and after the reflow.

4. The planar connector according to claim 1, wherein (C) the resin composition has an apparent melt viscosity of 55 Pa·s or smaller, determined by using a capillary rheometer having L=20 mm and d=1 mm, at the temperature of 360° C. at a shear rate of 1000/s according to ISO11443, and the planar connector has 0.09 mm or smaller flatness before IR-reflow step for surface mounting at a peak temperature of 230° C. to 280° C. and has 0.02 mm or smaller difference in flatness before and after the reflow.

5. The planar connector according to claim 1, wherein (C) the resin composition has 55 Pa·s or smaller apparent melt viscosity determined by using a capillary rheometer having L=20 mm and d=1 mm, at 360° C. and 1000/s of shear rate, conforming to ISO11443.

6. The planar connector according to claim 1, having 0.09 mm or smaller flatness before IR-reflow step for surface mounting at a peak temperature of 230° C. to 280° C., and having 0.02 mm or smaller difference in flatness before and after the reflow.

7. The planar connector according to claim 2, having 0.09 mm or smaller flatness before IR-reflow step for surface mounting at a peak temperature of 230° C. to 280° C., and having 0.02 mm or smaller difference in flatness before and after the reflow.

8. The planar connector according to claim 5, having 0.09 mm or smaller flatness before IR-reflow step for surface mounting at a peak temperature of 230° C. to 280° C., and having 0.02 mm or smaller difference in flatness before and after the reflow.

9. The planar connector according to claim 1, wherein (C) the resin composition has an apparent melt viscosity of 55 Pa·s or smaller, determined by using a capillary rheometer having L=20 mm and d=1 mm, at the temperature of 360° C. at a shear rate of 1000/s according to ISO11443, and the planar connector has 0.09 mm or smaller flatness before IR-reflow step for surface mounting at a peak temperature of 230° C. to 280° C. and has 0.02 mm or smaller difference in flatness before and after the reflow.

10. A planar connector according to claim 1, wherein there is an opening in the lattice area.

\* \* \* \* \*